(12) United States Patent
Nishida et al.

(10) Patent No.: US 8,892,134 B2
(45) Date of Patent: Nov. 18, 2014

(54) MOBILE COMMUNICATION METHOD, CALL CONTROL NODE, PRIORITY CONTROL NODE AND MOBILITY MANAGEMENT NODE

(75) Inventors: Katsutoshi Nishida, Tokyo (JP); Keisuke Suzuki, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/520,206

(22) PCT Filed: Dec. 14, 2010

(86) PCT No.: PCT/JP2010/072496
§ 371 (c)(1),
(2), (4) Date: Sep. 18, 2012

(87) PCT Pub. No.: WO2011/083662
PCT Pub. Date: Jul. 14, 2011

(65) Prior Publication Data
US 2013/0012243 A1 Jan. 10, 2013

(30) Foreign Application Priority Data
Jan. 6, 2010 (JP) .............................. 2010-001452

(51) Int. Cl.
*H04W 68/00* (2009.01)
*H04L 29/06* (2006.01)
*H04W 76/00* (2009.01)

(52) U.S. Cl.
CPC ......... *H04W 76/007* (2013.01); *H04L 65/1006* (2013.01); *H04L 65/105* (2013.01)
USPC ........ 455/458; 455/527; 455/453; 455/414.1; 379/161

(58) Field of Classification Search
CPC H04W 76/007; H04L 65/1006; H04L 65/105
USPC .......... 455/527, 453, 414.1, 458; 379/208.01, 379/201.04, 161
See application file for complete search history.

(56) References Cited

U.S. PATENT DOCUMENTS 5,570,411 A 10/1996 Sicher
7,941,175 B1 * 5/2011 Hoff et al. ...................... 455/527

(Continued)

FOREIGN PATENT DOCUMENTS

EP 1217855 B1 * 3/2006 ............... H04Q 7/38
JP 6-509456 A 10/1994

OTHER PUBLICATIONS

Notification of Reasons for Rejection for Japanese Patent Application No. 2010-001452 dated Jan. 18, 2012, with English translation thereof (5 pages).

(Continued)

Primary Examiner — Shahriar Behnamian
(74) Attorney, Agent, or Firm — Osha Liang LLP

(57) ABSTRACT

The present invention provides the steps of: at a priority control node (PCRF), when reception of an invite signal including priority call information is notified from a call control node (P-CSCF), determining whether it is required to change the ARP of a call control signal bearer for sending the invite signal from a gateway (P-GW) to a mobile terminal (UE) to a higher ARP than the priority set in the call control signal bearer; when change of the ARP is determined to be required, changing the ARP of the call control signal bearer to a higher ARP than the ARP set in the call control signal bearer; and performing a paging for the mobile terminal (UE) according to the priority of the call control signal bearer.

13 Claims, 15 Drawing Sheets

(56) References Cited

U.S. PATENT DOCUMENTS

2007/0232276 A1* 10/2007 Andersson ................ 455/414.1
2009/0285377 A1* 11/2009 Sennett et al. ........... 379/201.04
2010/0020812 A1* 1/2010 Nakamura et al. ............ 370/401

OTHER PUBLICATIONS

International Search Report from PCT/JP2010/072496 dated Jan. 18, 2011 (1 page).

3GPP TS 23.203 V9.3.0; "3rd Generation Partnership Project; Technical Specification Group Services and System Aspects; Policy and charging control architecture (Release 9)"; Dec. 2009 (6 pages).

3GPP TS23.401 V9.3.0; 3rd Generation Partnership Project; Technical Specification Group Services and System Aspects; General Packet Radio Service (GPRS) enjancements for Evolved Universal Terrestrial Radio Access Network (E-UTRAN) access (Release 9); Dec. 2009 (13 pages).

3GPP TS 23.228 V8.11.0; 3rd Generation Partnership Project; Technical Specification Group Services and System Aspects; IP Multimedia Subsystem (IMS); Stage 2 (Release 8); Dec. 2009 (248 pages).

* cited by examiner

| BEARER ID | ARP |
|---|---|
| 00001 | 9 (HIGH PRIORITY) |
| 00002 | 10 (MEDIUM PRIORITY) |
| 00003 | 11 (LOW PRIORITY) |
| ⋮ | ⋮ |

MOBILE COMMUNICATION METHOD, CALL CONTROL NODE, PRIORITY CONTROL NODE AND MOBILITY MANAGEMENT NODE

TECHNICAL FIELD

The present invention relates to a mobile communication method, a call control node, a priority control node and a mobility management node, for performing call control between mobile terminals.

BACKGROUND ART

A mobile communication system to utilize an IMS (IP Multimedia Subsystem) is defined in non-patent literature 1. In this mobile communication system, upon receiving a call connection request signal (for example, an INVITE signal of SIP) for a mobile terminal UE, the IMS transfers the received call connection request signal to the mobile terminal UE, via an IMS call control signal bearer which the mobile terminal UE establishes in the packet network (for example, Evolved Packet Core).

CITATION LIST

Non-Patent Literature

Non-Patent Literature 1: 3GPP TS23.228

SUMMARY OF INVENTION

Technical Problem

However, in the above-described mobile communication system, there is a problem that, even when a call connection request signal for a call to be prioritized (hereinafter "priority call") such as important communication and so on, for a mobile terminal UE, is received, the IMS is unable to perform paging for the mobile terminal UE regarding the priority call more preferentially than a mobile terminal UE regarding a normal call, in order to establish an IMS call control signal bearer for transferring the call connection request signal for the priority call.

Also, in the above-described mobile communication system, even when paging for a mobile terminal UE regarding a priority call can be performed in order to establish an IMS call control signal bearer for the priority call, resources cannot be allocated to the IMS call control signal bearer for the priority call more preferentially than an IMS call control signal bearer for a normal call, and therefore there is a problem that cases occur where establishment of an IMS call control signal bearer for a priority call fails or an IMS call control signal bearer for a priority call having been established is disconnected.

Such problems will be described in detail with reference to FIGS. 1 to 5.

FIG. 1 is a diagram illustrating the first example of failing establishing an IMS call control signal bearer for a priority call. As illustrated in FIG. 1, when an invite signal, which includes priority call information indicating reception of a priority call (step S1001), is received, the call control node P-CSCF (Proxy-Call Session Control Function) transfers the received invite signal to the gateway P-GW (PDN-Gateway) (step S1002).

The gateway P-GW sends a GTP-U (GPRS Tunneling Protocol-U plane) data packet or a PMIPv6 (Proxy Mobile IPv6) data packet, including the invite signal received in step S1002, to the gateway S-GW (Serving-Gateway) (step S1003).

Upon receiving the above GTP-U data packet or PMIP data packet, the gateway S-GW sends "Downlink Data Notification" to a mobility management node MME (step S1004).

Here, the mobility management node MME is unable to decide whether or not a received "Downlink Data Notification" is a signal related to a priority call or a signal related to a normal call. Consequently, the mobility management node MME in a congestion state is unable to perform sending processing for "Paging" in response to "Downlink Data Notification" related to a priority call such as described above, more preferentially than sending processing for "Paging" for "Downlink Data Notification" related to normal call, and therefore discards "Downlink Data Notification" related to priority call (step S1005).

In this way, in the case illustrated in FIG. 1, there is a problem that a mobile terminal UE is unable to receive "Paging" related to a priority call, and therefore an IMS call control signal bearer for transferring a call connection request signal for a priority call to the mobile terminal UE cannot be established between the mobile terminal UE and the gateway S-GW.

FIG. 2 is a diagram illustrating a second example of failing establishing an IMS call control signal bearer for a priority call. Note that the operations of step S2001 through S2004 in FIG. 2 are the same as the operations of step S1001 through S1004 in FIG. 1.

As illustrated in FIG. 2, upon receiving the above-described "Downlink Data Notification," the mobility management node MME sends "Paging" to a radio base station eNode B (step S2005).

Here, the radio base station eNode B is unable to decide whether or not a received "Paging" is a signal related to a priority call or a signal related to a normal call. Consequently, the radio base station eNode B in a congestion state is unable to perform sending processing for "Paging" related to a priority call such as described above, more preferentially than sending processing for "Paging" related to a normal call, and therefore has to discard "Paging" related to the priority call (step S2006).

Thus, even in the case illustrated in FIG. 2, there is a problem that a mobile terminal UE is unable to receive "Paging" related to a priority call, and therefore an IMS call control signal bearer for transferring a call connection request signal for a priority call to the mobile terminal UE cannot be established between the mobile terminal UE and a gateway S-GW.

FIG. 3 is a diagram illustrating a third example of failing establishing an IMS call control signal bearer for a priority call. Note that the operations of step S3001 through S3005 in FIG. 3 are the same as the operations of step S2001 through S2005 in FIG. 2.

Upon receiving "Paging" from the mobility management node MME, the radio base station eNode B sends "Paging" to the mobile terminal UE located in the own cell (step S3006). In response to "Paging" received from the radio base station eNode B, the mobile terminal UE sends "RRC Connection Request" to the radio base station eNode B (step S3007).

Here, the radio base station eNode B is unable to determine whether or not a received "RRC Connection Request" is a signal related to a priority call or a signal related to a normal call. Consequently, the radio base station eNode B in a congestion state is unable to perform processing for "RRC Connection Request" related to a priority call such as described above, more preferentially than processing for "RRC Connection Request" related to a normal call, and therefore has to discard "RRC Connection Request" related to the priority call (step S3008).

Thus, in the case illustrated in FIG. 3, there is a problem that an RRC connection cannot be established between a mobile terminal UE and a radio base station eNode B, and therefore an IMS call control signal bearer for transferring a call connection request signal for a priority call to the mobile terminal UE cannot be established between the mobile terminal UE and a gateway S-GW.

FIG. 4 is a diagram illustrating a fourth example of failing establishing an IMS call control signal bearer for a priority call. Note that the operations of step S4001 through S4006 in FIG. 4 are the same as the operations of step S3001 through S3006 in FIG. 3.

Upon receiving "Paging" from the radio base station eNode B, the mobile terminal UE performs "RRC Connection establishment procedure" for establishing an RRC connection with the radio base station eNode B (step S4007). The mobile terminal UE sends "Service Request" to request establishment of a radio access bearer (E-RAB: EPS Radio Access Bearer) between the mobile terminal UE and the gateway S-GW, to the mobility management node MME (step S4008).

Upon receiving "Service Request" from the mobile terminal UE, the mobility management node MME sends "Initial Context Setup Request" to the radio base station eNode B (step S4009).

Here, the radio base station eNode B is unable to determine whether a received "Initial Context Setup Request" is a signal related to a priority call or a signal related to a normal call. Consequently, the radio base station eNode B in a congestion state is unable to perform processing for "Initial Context Setup Request" related to a priority call such as described above, more preferentially than processing for "Initial Context Setup Request" related to a normal call, and therefore has to discard "Initial Context Setup Request" related to the priority call (step S4010).

Thus, in the case illustrated in FIG. 4, there is a problem that a radio access bearer cannot be established between a mobile terminal UE and a gateway S-GW, and therefore an IMS call control signal bearer for transferring a call connection request signal for a priority call from a call control node P-CSCF to the mobile terminal UE cannot be established between the mobile terminal UE and the gateway S-GW.

FIG. 5 is a diagram illustrating an example where an IMS call control signal bearer for a priority call is disconnected. As illustrated in FIG. 5, an IMS call control signal bearer for sending and receiving an IMS call control signal for a priority call between gateway P-GW and mobile terminal UE #1 of a general user is established (step S5001). Next, assume that an IMS call control signal bearer for sending and receiving an IMS call control signal for a normal call between the gateway P-GW and mobile terminal UE #2 of a priority user is established (step S5002).

Here, since the user of mobile terminal UE #2 is a priority user, in a call control signal bearer for a normal call addressing mobile terminal UE #2, a higher priority than the priority of an IMS call control signal bearer for a priority call addressing mobile terminal UE #1 of a general user, is set. Consequently, the radio base station eNode B allocates resources to the IMS call control signal bearer for a normal call addressing mobile terminal UE #2 of a priority user preferentially, and, therefore, when resources run short, has to discard the IMS call control signal bearer for a priority call addressing mobile terminal UE #1 of a general user (step S5003).

In this way, in the case illustrated in FIG. 5, in the event resources are allocated preferentially to the IMS call control signal bearer for the priority user, there is a problem that the IMS call control signal bearer for the general user is disconnected regardless of whether or not to be performing communication related to a priority call.

Also, after the IMS call control signal bearer for a priority call addressing mobile terminal UE #1 is disconnected, if the call control node P-CSCF receives an IMS call control signal for a priority call (for example, an SIP signal) (step S5004), the call control node P-CSCF transfers the received IMS call control signal to the gateway P-GW (step S5005), and, as described with reference to FIGS. 1 to 4, tries re-establishing the disconnected IMS call control signal bearer (steps S5006 to S5009).

However, as described above, each apparatus that is in a congestion state is unable to perform processing for a signal related to a priority call more preferentially than processing for a signal related to a normal call, and therefore has to discard the signal related to a priority call (for example, step S5009). Consequently, in the case illustrated in FIG. 5, there is a problem that the IMS call control signal bearer for a priority call addressing mobile terminal UE #1 cannot be reestablished.

The present invention has been made in view of the above problems, and it is therefore an object of the present invention to provide a mobile communication method, a call control node, a priority control node and a mobility management node that, in the event a priority call for a mobile terminal UE is received, allow an IMS call control signal bearer for the priority call to be established more preferentially than an IMS call control signal bearer for a normal call, and allow the IMS call control signal for the priority call to be transferred preferentially.

Solution to Problem

The first feature of the present invention is a mobile communication method including the steps of: at a call control node, notifying a reception of a call connection request signal including priority call information, to a priority control node; at the priority control node, in response to a notification of the reception of the call connection request signal from the call control node, determining whether it is required to change a priority of a call control signal bearer for sending the call connection request signal from a first gateway connected to the call control node to a mobile terminal, to a higher priority than a priority set in the call control signal bearer; changing the priority of the call control signal bearer to the higher priority than the priority set in the call control signal bearer, when it is required to change the priority of the call control signal bearer; and performing a paging for the mobile terminal according to the priority of the call control signal bearer.

A second feature of the present invention is a call control node configured to receive a call connection request signal including priority call information, notify a reception of the call connection request signal to a priority control node that controls a priority of a call control signal bearer that is established for sending the call control request signal between a first gateway and a mobile terminal, and send the call connection request signal to the first gateway, wherein the call control signal bearer is established according to a priority that is designated by the priority control node.

A third feature of the present invention is a priority control node configured to determine, when it is notified from a call control node that a call connection request signal including priority call information has been received, whether it is required to change a priority of a call control signal bearer for sending the call connection request signal from a first gateway connected to the call control node to a mobile terminal, to a higher priority than a priority set in the call control signal bearer.

A fourth feature of the present invention is a mobility management node configured to receive a bearer update request signal including a higher priority than a priority set in the call control signal bearer, and send, when the priority included in the bearer update request signal is a priority which requires to perform a paging preferentially, a paging signal including a priority indication which requires to perform the paging preferentially to a radio base station belonging to the mobility management node, more preferentially than a paging signal not including the priority indication.

Technical Advantages of Invention

According to the present invention, it is possible to provide a mobile communication method, a call control node, a priority control node and a mobility management node that, in the event a priority call for a mobile terminal UE is received, allow an IMS call control signal bearer for the priority call to be established more preferentially than an IMS call control signal bearer for a normal call, and allow the IMS call control signal for the priority call to be transferred preferentially.

DESCRIPTION OF EMBODIMENTS

Now, embodiments of the present invention will be described below in detail with reference to the accompanying drawings.

(First Embodiment)
<Configuration of Mobile Communication System>

Figure 1:
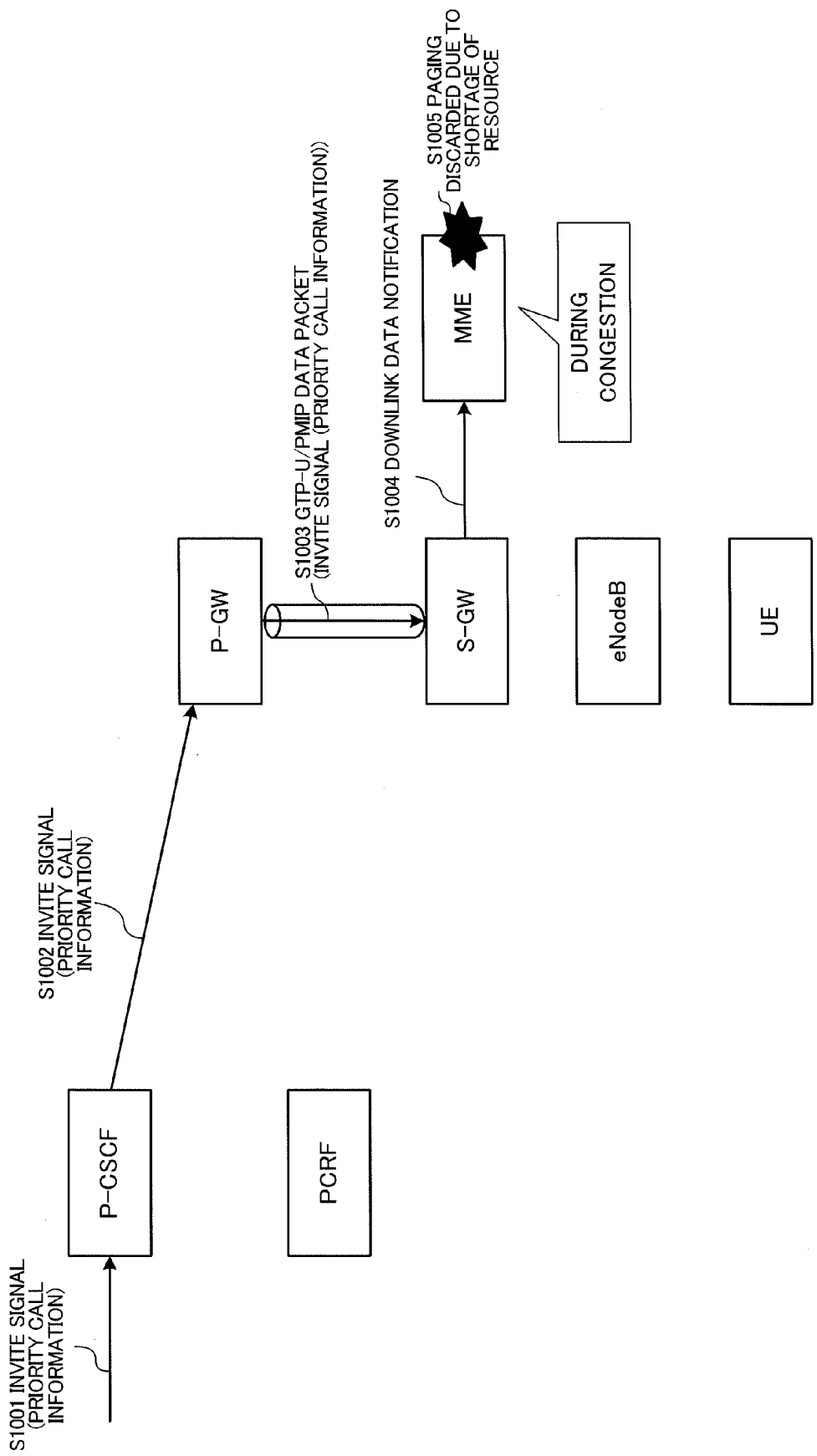
FIG. 1 is a sequence diagram illustrating conventional operations upon reception of a priority call.
Figure 2:
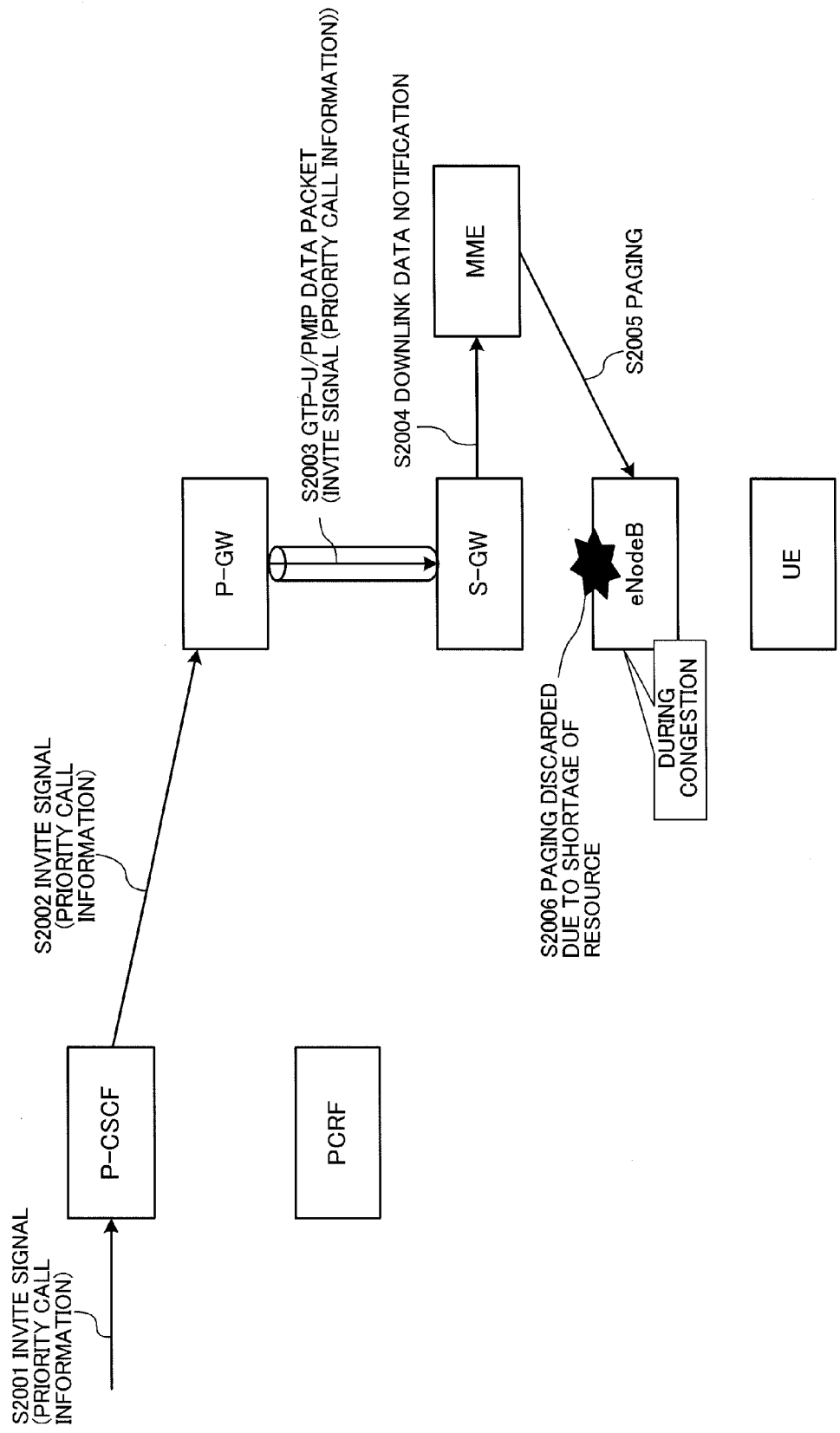
FIG. 2 is a sequence diagram illustrating conventional operations upon reception of a priority call.
Figure 3:
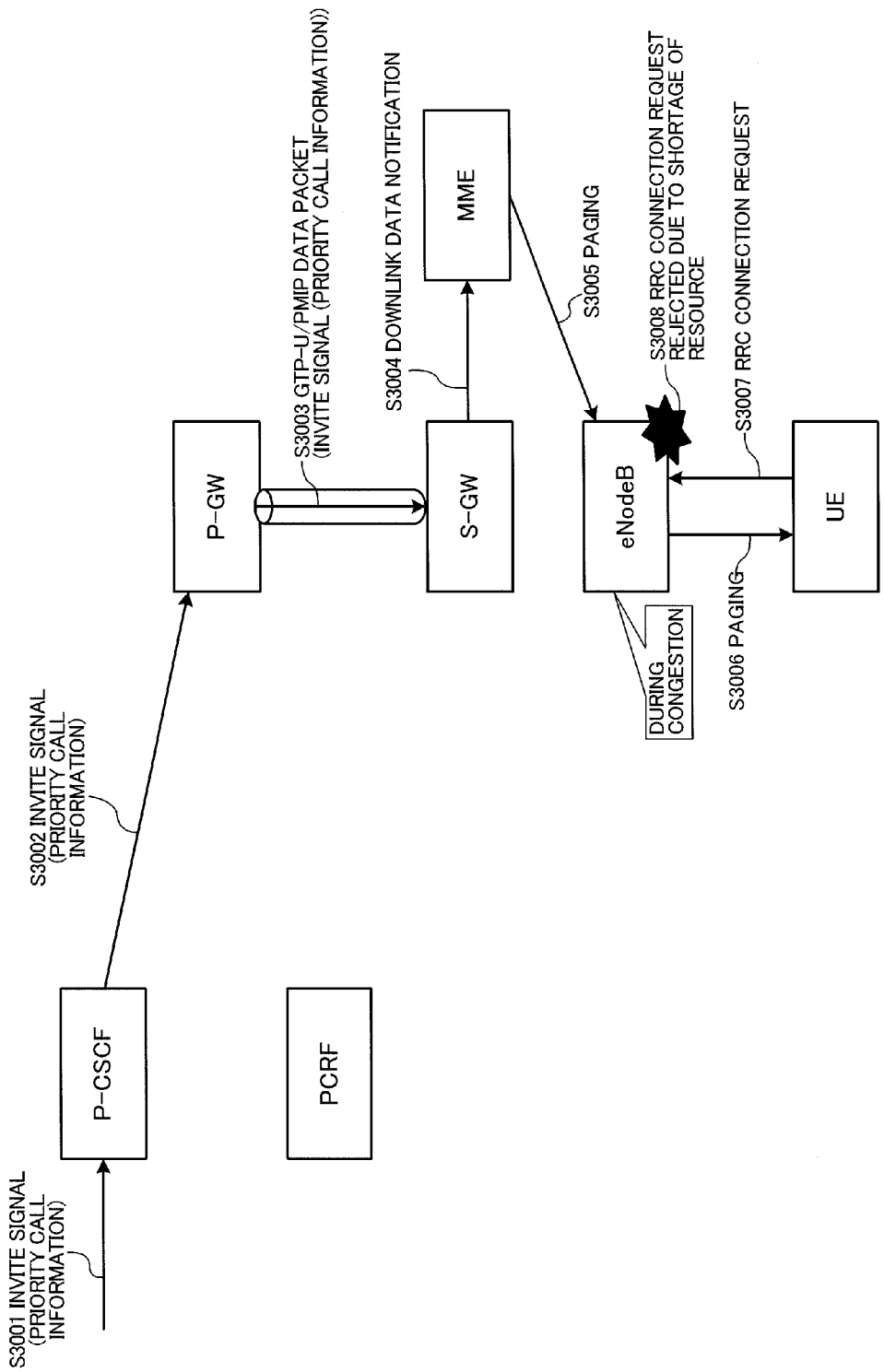
FIG. 3 is a sequence diagram illustrating conventional operations upon reception of a priority call.
Figure 4:
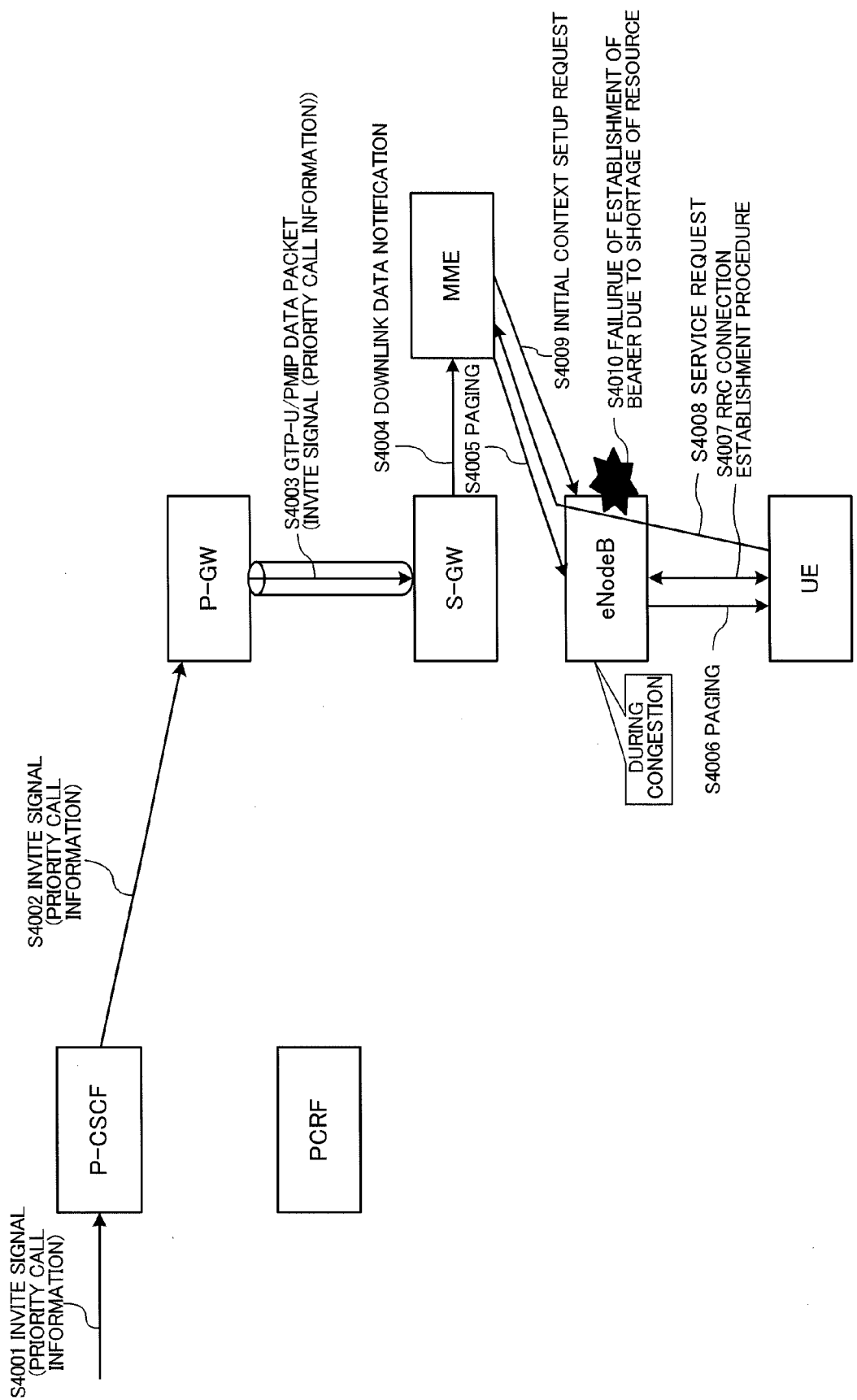
FIG. 4 is a sequence diagram illustrating conventional operations upon reception of a priority call.
Figure 5:
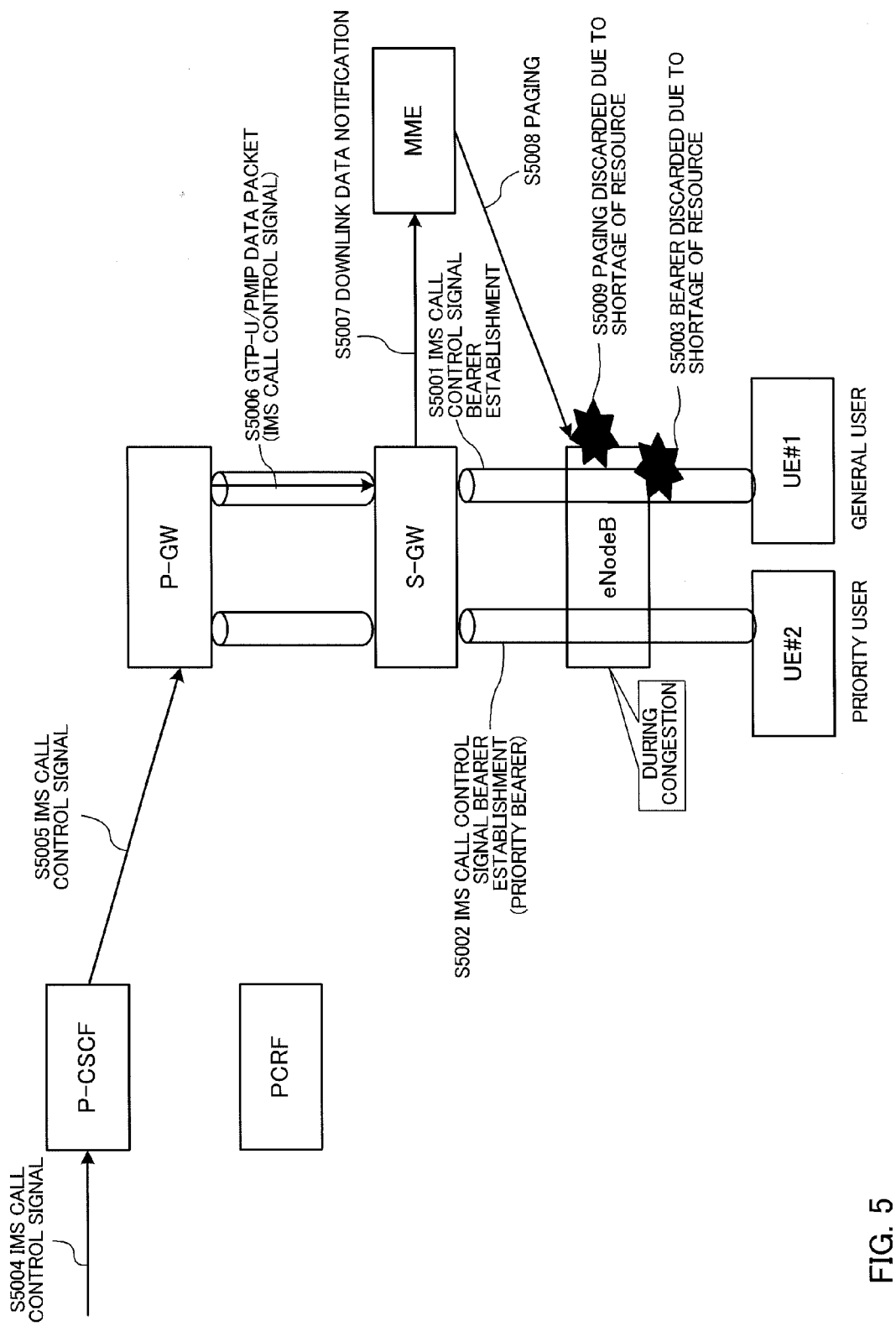
FIG. 5 is a sequence diagram illustrating conventional operations upon reception of a priority call.
Figures 6, 7:
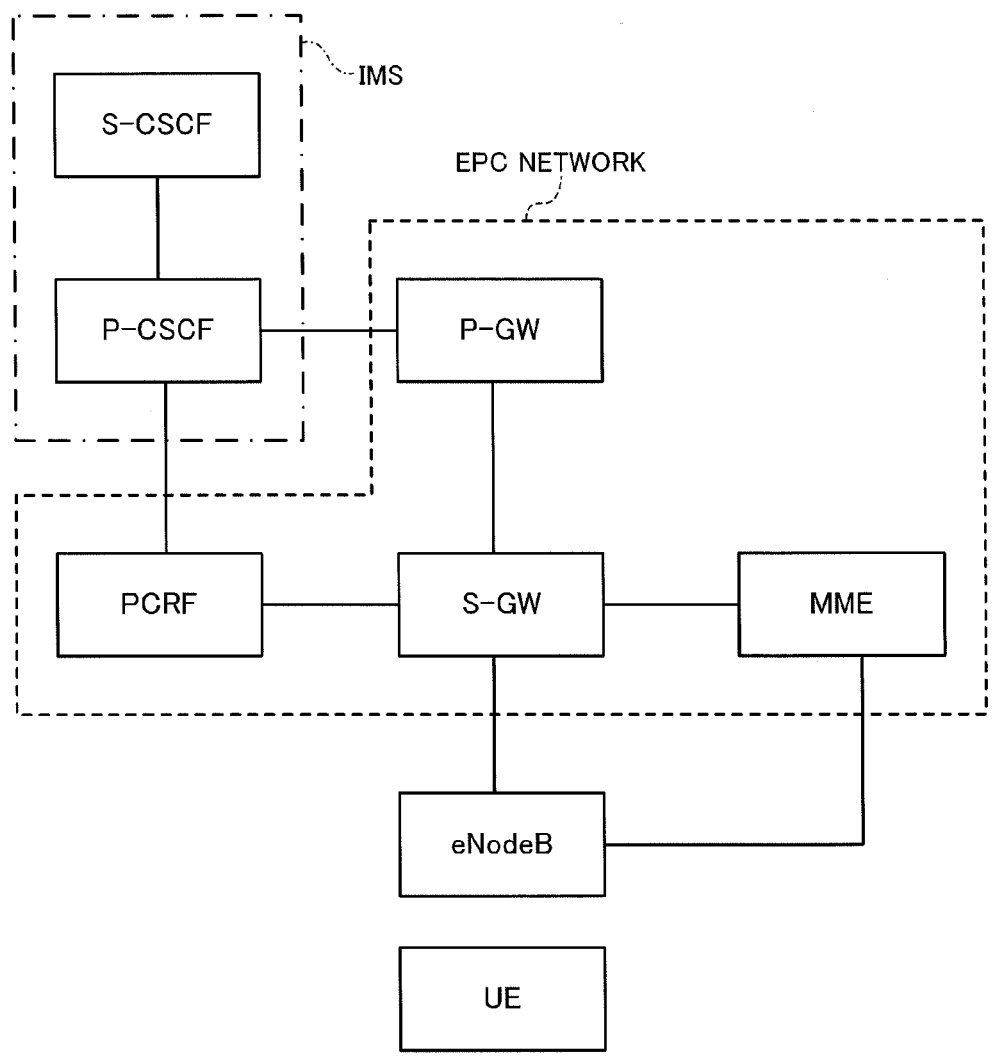
FIG. 6 is a schematic configuration diagram of a mobile communication system according to the first embodiment.
FIG. 7 is a diagram for explaining ARPs according to the first embodiment.

FIG. 6 is a diagram illustrating a configuration of a mobile communication system. The mobile communication system is formed with an IMS that offers IP-based multimedia communication services such as VoIP, an EPC network that transfers IP packets, a mobile terminal UE, and a radio base station eNode B that performs radio communication of the LTE scheme with the mobile terminal UE and connects that mobile terminal UE to the EPC network.

Note that the present invention is applicable to cases where the mobile terminal UE is connected to the EPC network by radio communication of the UMTS/GPRS scheme. In this case, the mobile terminal UE performs radio communication of the UMTS/GPRS scheme with the radio base station NodeB/BTS (not shown), and also is connected to a gateway S-GW of the EPC network via a radio control apparatus RNC/BSC and an exchange SGSN (not shown).

As illustrated in FIG. 6, in the IMS, a call control node S-CSCF and a call control node P-CSCF that perform call control between mobile terminals UEs using SIP are provided. Also, in the EPC network, a priority control node PCRF (Policy and Charging Rules Function) to control QoS in communication of the mobile terminal UE, a gateway P-GW that is connected to the call control node P-CSCF, a gateway S-GW that is connected to the gateway P-GW, and a mobility management node MME that performs mobility management of the mobile terminal UE, are provided.

Also, in the EPC network, either GTP (GPRS Tunneling Protocol) or PMIPv6 (Proxy Mobile IPv6) is used as the signal protocol between the gateway P-GW and the gateway S-GW. In the event GTP is used, the priority control node PCRF is connected to the gateway P-GW but is not connected to the gateway S-GW. Note that, in the event GTP is used, a GTP tunnel is set up between the gateway P-GW and the gateway S-GW. On the other hand, in the event PMIPv6 is used, the priority control node PCRF is connected to both the gateway P-GW and the gateway S-GW. Note that, in the event PMIPv6 is used, a GRE (Generic Routing Encapsulation) tunnel is set up between the gateway P-GW and the gateway S-GW.

In the mobile communication system illustrated in FIG. 6, an IMS call control signal bearer (call control signal bearer) is established between the gateway P-GW and the mobile terminal UE. Here, the IMS call control signal bearer refers to a logical communication path for sending and receiving IMS call control signals such as an SIP signal between the gateway P-GW and the mobile terminal UE, and is a bearer to be set up in "IP-CAN (IP-Connectivity Access Network)." Also, the IMS call control signal bearer is formed by connecting the GTP tunnel or GRE tunnel that is set up between the gateway P-GW and the gateway S-GW, and the radio access bearer that is set up between the gateway S-GW and the mobile terminal UE.

Also, in the IMS call control signal bearer, ARP (Allocation and Retention Priority), which indicates relative priority between IMS call control signal bearers, is set. The priority control node PCRF controls the ARP (priority) of the IMS call control signal bearer, and, as illustrated in FIG. 7, the bearer ID and ARP of the IMS call control signal bearer are associated and managed. The ARP is set according to the priority of the user of the mobile terminal UE, and, for example, is set to "9 . . . high priority" if the user of the mobile terminal UE is a priority user, or is set to "10 . . . medium priority" if the user of the mobile terminal UE is a general user.

Radio resources and network resources are allocated to the IMS call control signal bearer according to the priority indicated by the ARP, and an IMS call control signal bearer having a high priority indicated by the ARP is established preferentially. To be more specific, procedure for establishing an IMS call control signal bearer having a high priority indicated by the ARP (that is to say, a paging procedure for the mobile terminal UE in an idle state, an RRC connection establishment procedure between the mobile terminal UE and the radio base station eNode B, a radio access bearer establishment procedure between the mobile terminal UE and the gateway S-GW, a GTP tunnel or PMIP GRE tunnel establishment procedure between the gateway S-GW and the gateway P-GW, and so on) are performed more preferentially than procedure for establishing an IMS call control signal bearer having a low priority indicated by the ARP.

In the mobile communication system illustrated in FIG. 6, when an INVITE signal (call connection request signal) that includes priority call information indicating a call to be prioritized (hereinafter "priority call") such as important communication is received from the mobile terminal UE on the originating side, the call control node P-CSCF notifies reception of an INVITE signal including priority call information, to the priority control node PCRF.

Also, in response to the notification of reception of an INVITE signal including priority call information from the call control node P-CSCF, the priority control node PCRF determines whether it is required to change the ARP of the IMS call control signal bearer for sending the INVITE signal to the mobile terminal to a higher ARP than the ARP that is set.

For example, in the event the bearer ID of the IMS call control signal bearer for a priority call is the bearer ID "00003" of FIG. 7, the priority control node PCRF determines that it is required to change the ARP "11 (low priority)" that is set in advance, to "9 (high priority)," to increase the priority of the IMS call control signal bearer. On the other hand, in the event the bearer ID of the IMS call control signal bearer for a priority call is the bearer ID "00001" of FIG. 7, the priority control node PCRF determines that it is not required to change the ARP "9 (high priority)," because the priority of the IMS call control signal bearer is already set high.

When the priority control node PCRF determines that it is required to change the ARP of the IMS call control signal bearer, in the mobile communication system illustrated in FIG. 6, a processing to change the value of the ARP of the IMS call control signal bearer to a value to indicate a higher priority than the ARP value that is set in advance, is performed.

In this way, in the mobile communication system illustrated in FIG. 6, in the event the call control node P-CSCF receives an INVITE signal that includes priority call information, the ARP (priority) of an IMS call control signal bearer for sending the INVITE signal to the mobile terminal is changed higher, so that it is possible to set up an IMS call control signal bearer for a priority call more preferentially than an IMS call control signal bearer for a normal call, and transfer an INVITE signal for a priority call preferentially.

<Operations of Mobile Communication System>

Next, referring to FIGS. 8 to 13, the operations of the mobile communication system according to the first embodiment will be described. A case will be described below with the first embodiment where GTP is used as the signal protocol between the gateway P-GW and the gateway S-GW.

(1-1) Operations Upon Reception of Priority Call

Figure 8:
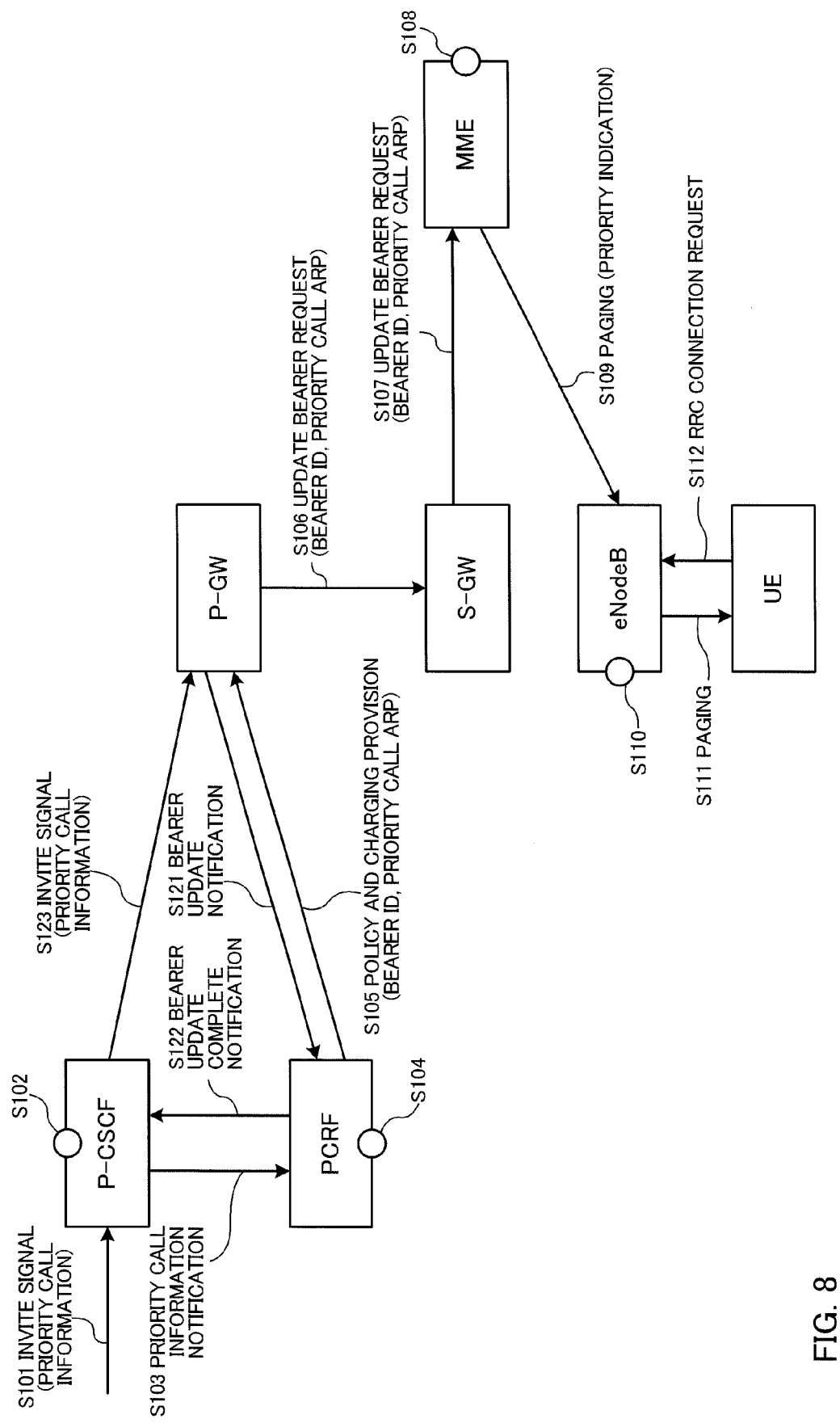
FIG. 8 is a schematic diagram illustrating operations upon reception of a priority call, according to the first embodiment.
Figure 9:
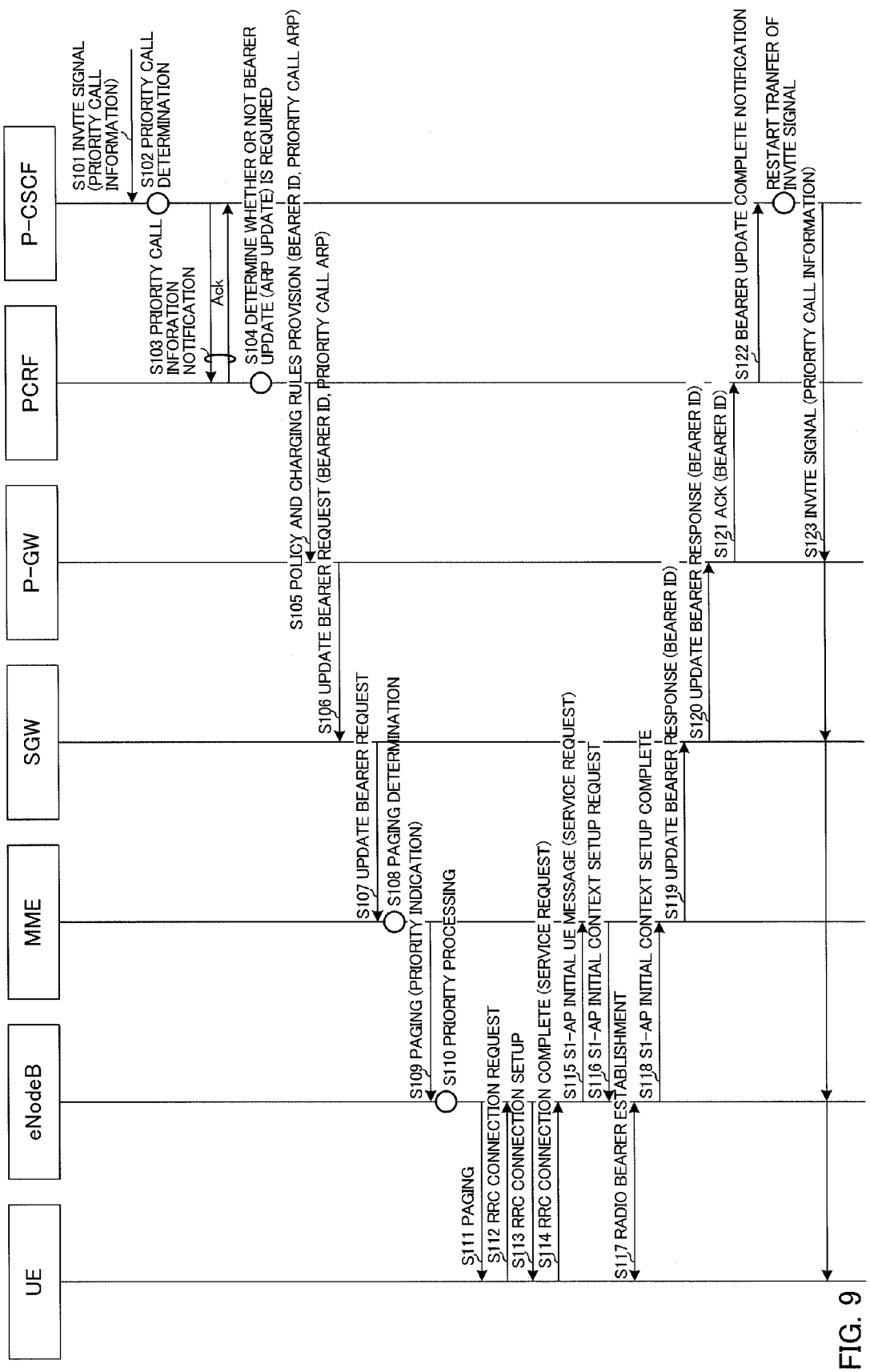
FIG. 9 is a sequence diagram illustrating operations upon reception of a priority call, according to the first embodiment.

Now, with reference to FIGS. 8 to 11, the operations of the mobile communication system according to the first embodiment upon reception of a priority call will be described. FIGS. 8 and 9 are a schematic diagram and a sequence diagram illustrating the operations of the mobile communication system according to the first embodiment upon reception of a priority call. Note that the same codes in FIGS. 8 and 9 designate the same steps.

As illustrated in FIGS. 8 and 9, upon receiving an invite signal (call connection request signal) (step S101), the call control node P-CSCF determines whether or not priority call information is included in the received invite signal (step S102).

In the event the received invite signal includes priority call information, the call control node P-CSCF sends "priority call information notification," which notifies reception of an invite signal for a priority call, to the priority control node PCRF, and the priority control node PCRF sends "Ack," which notifies reception of "priority call information notification," to the call control node P-CSCF (step S103).

Upon receiving "priority call information notification" from the priority control node PCRF, the call control node P-CSCF determines whether it is required to change the ARP of the IMS call control signal bearer for sending the INVITE signal to the mobile terminal UE (step S104).

Figure 10:
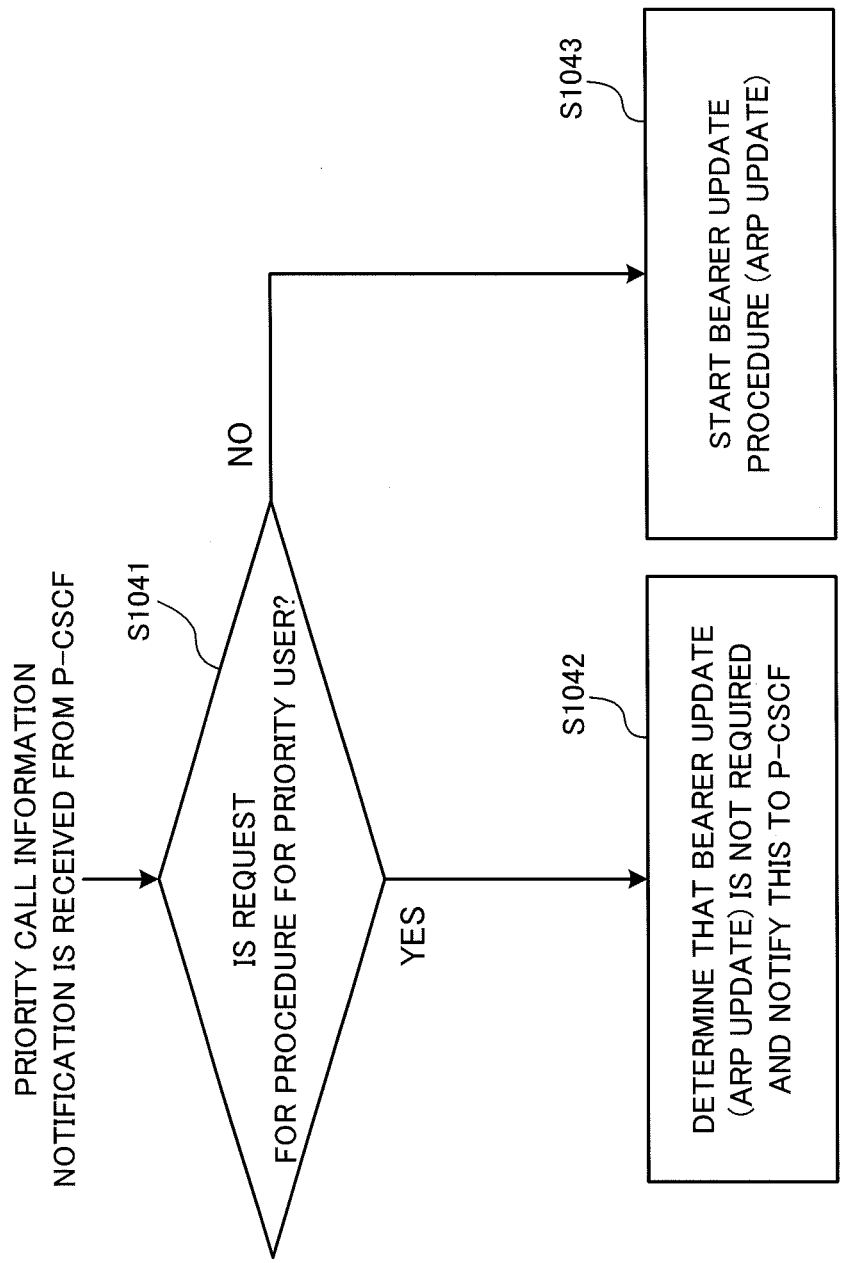
FIG. 10 is a flowchart illustrating operations upon reception of a priority call, according to the first embodiment.

FIG. 10 is a flow for determining whether it is required to change the ARP of an IMS call control signal bearer in the priority control node PCRF. As illustrated in FIG. 10, upon receiving "priority call information notification" from the call control node P-CSCF, the priority control node PCRF determines whether or not the received "priority call information notification" is a notification for a mobile terminal UE of a priority user (step S1041).

In the event "priority call information notification" is determined to be a notification for a mobile terminal UE of a priority user (step S1041: Yes), given that the ARP of the IMS call control signal bearer is already set to "9 (high priority)," the priority control node PCRF determines that it is not required to change the ARP of the IMS call control signal bearer, and notifies this to the call control node P-CSCF (step S1042). For example, in the case illustrated in FIG. 7, the priority control node PCRF determines that it is not required to change the ARP of the IMS call control signal bearer of the bearer ID "00001".

On the other hand, in the event "priority call information notification" is determined not to be a notification for a mobile terminal UE of a priority user (step S1041: No), given that the ARP of the IMS call control signal bearer is not set to "9 (high priority)," the priority control node PCRF determines that it is required to change the ARP of the IMS call control signal bearer, and starts the process of changing the ARP (step S1043). For example, in the case illustrated in FIG. 7, the priority control node PCRF determines that it is required to change the ARP of the IMS call control signal bearer of the bearer ID "00003."

By means of the above determining flow, when the processing of changing the ARP of the IMS call control signal bearer is determined to be required, the ARP change processing is performed in step S105 to S121 illustrated in FIGS. 8 and 9. To be more specific, the priority control node PCRF sends "Policy and Charging Rules Provision" to the gateway P-GW (step S105). Here, "Policy and Charging Rules Provision" functions as a priority change request signal to request change of the ARP of the IMS call control signal bearer to a priority call ARP, and includes a bearer ID to identify the IMS call control signal bearer, and a priority call ARP. Also, a priority call ARP refers to an ARP of a higher priority than the ARP that is set in advance in the IMS call control signal bearer, and, for example, is an ARP that is set to 9 (high priority).

The gateway P-GW sends "Update Bearer Request," which includes the bearer ID and priority call ARP included in "Policy and Charging Rules Provision," to the gateway S-GW (step S106). Here, "Update Bearer Request (bearer update request signal)" requests updating of the parameter of the IMS call control signal bearer, and, when an ARP is included, requests change of the ARP of the IMS call control signal bearer.

The gateway S-GW transfers "Update Bearer Request" received from the gateway P-GW, to the mobility management node MME (step S107).

Upon receiving above-described "Update Bearer Request," the mobility management node MME determines whether or not it is required to perform paging (priority paging) preferentially for the mobile terminal UE (step S108).

Figure 11:
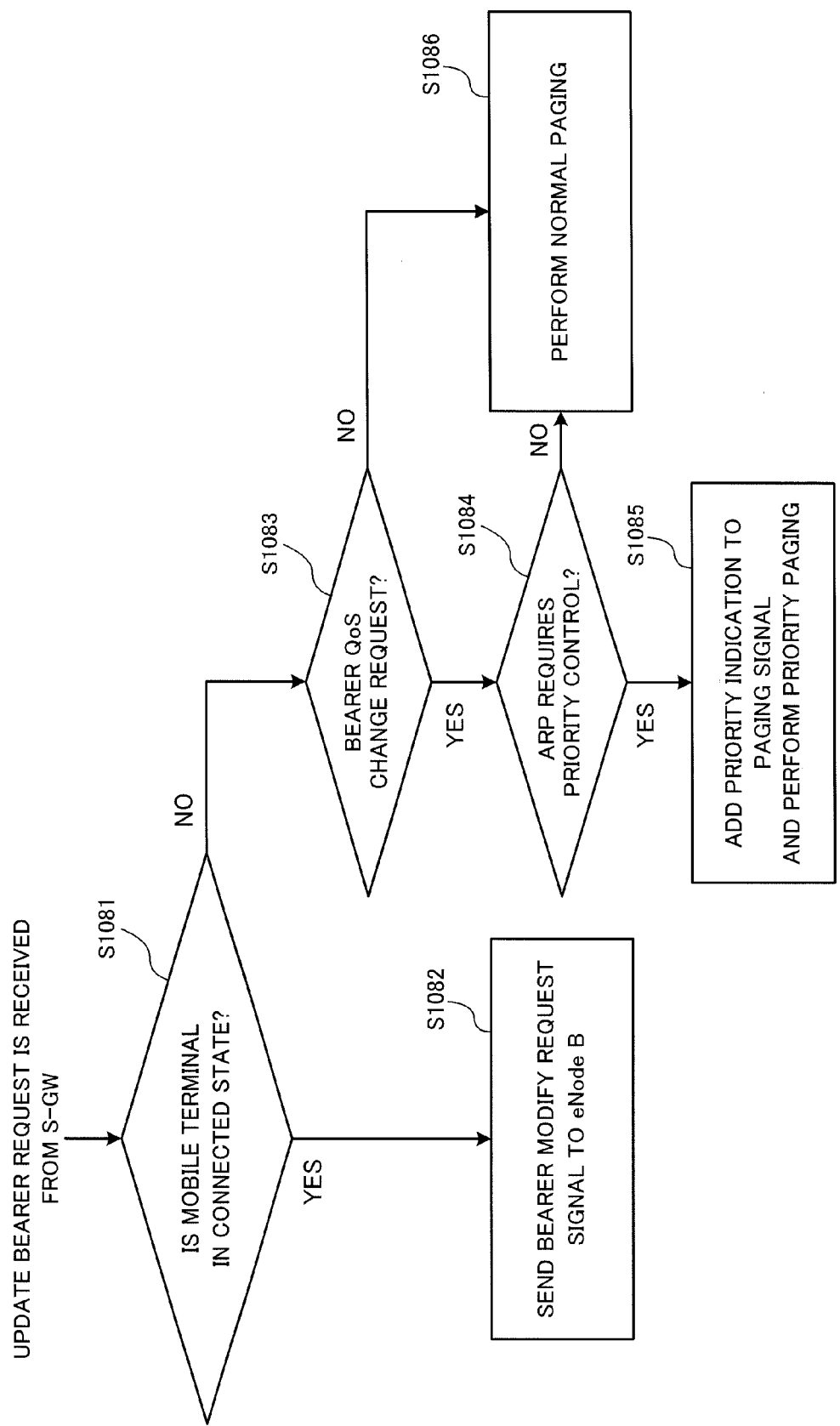
FIG. 11 is a flowchart illustrating operations upon reception of a priority call, according to the first embodiment.

FIG. 11 is a flow for determining whether or not priority paging is required for a mobile terminal UE. As illustrated in FIG. 11, upon receiving "Update Bearer Request" from the gateway S-GW, the mobility management node MME determines whether or not the mobile terminal UE is in a connected state (step S1081).

In the event the mobile terminal UE is in a connected state (step S1081: Yes), the mobility management node MME does not have to perform the paging procedure for the mobile terminal UE, and therefore sends "Bearer Modify Request" to the radio base station eNode B (step S1082).

In the event the mobile terminal UE is not in a connected state (step S1081: No), the mobility management node MME determines whether or not "Update Bearer Request" received from the gateway S-GW requires change of the ARP of the IMS call control signal bearer (step S1083).

In the event "Update Bearer Request" received from the gateway S-GW requests change of the ARP (step S1083: Yes), the mobility management node MME determines whether or not the ARP included in "Update Bearer Request" is an ARP (for example, "11 (high priority)") that requires to perform paging preferentially (step S1084). In the event the ARP requires to perform paging preferentially (step S1084: Yes), the mobility management node MME adds a priority indication, which requires to perform the paging preferentially, to the paging signal (step S1085).

On the other hand, in the event "Update Bearer Request" does not require change of the ARP of the IMS call control signal bearer (step S1083: No), or in the event the ARP included in "Update Bearer Request" is not an ARP that requires to perform paging preferentially (step S1084: No), the mobility management node MME does not add the above-described priority indication to the paging signal (step S1086).

By means of the above decision flow, in the event priority paging is determined to be performed, priority paging is performed in steps S109 to S111 illustrated in FIGS. 8 and 9. To be more specific, the mobility management node MME sends "Paging" including the above-described priority indication, to the radio base station eNode B (step S109). Upon receiving "Paging" including a priority indication, the radio base station eNode B allocates radio resources to "Paging" including a priority indication, more preferentially than "Paging" not including a priority indication (step S110). The radio base station eNode B sends "Paging" to the mobile terminal UE using the allocated radio resources (step S111).

Upon receiving "Paging" from the radio base station eNode B, the mobile terminal UE sends "RRC Connection Setup" to set up an RRC connection to the mobile terminal UE (step S112), and receives "RRC Connection Setup" from the radio base station eNode B (step S113). The mobile terminal UE sends "RRC Connection Complete," which includes "Service Request," to the radio base station eNode B (step S114).

The radio base station eNode B sends "S1-AP Initial UE Message," which includes "Service Request," to the mobility management node MME (step S115), and the mobility management node MME sends "S1-AP Initial Context Setup Request" to the radio base station eNode B (step S116).

Upon receiving "S1-AP Initial Context Setup Request" from the mobility management node MME, the radio base station eNode B sets up a radio bearer with the mobile terminal UE (step S117), and sends "S1-AP Initial Context Setup Request Complete" to the mobility management node MME (step S118).

The mobility management node MME sends "Update Bearer Response" to the gateway S-GW (step S119). This "Update Bearer Response" notifies that the parameter (here, the ARP) of the IMS call control signal bearer has been changed, and includes a bearer ID that identifies the IMS call control signal bearer.

The gateway S-GW transfers "Update Bearer Request" received from the mobility management node MME to the gateway P-GW (step S120). Upon receiving "Update Bearer Request" from the gateway S-GW, the gateway P-GW sends "Ack," which notifies that ARP of IMS call control signal bearer has been changed, to priority control node PCRF (step S121).

The priority control node PCRF sends "bearer update complete notification," which notifies change of the ARP of the IMS call control signal bearer is complete, to the call control node P-CSCF (step S122). In response to this notification of completion of the IMS call control bearer update procedure, the call control node P-CSCF transfers an INVITE signal including priority call information, to the gateway P-GW. Using the changed IMS call control signal bearer, the gateway P-GW sends the INVITE signal which includes priority call information, to the mobile terminal UE, via the gateway S-GW and radio base station eNode B (step S123).

(1-2) Operations at Release of Priority Call

Figure 12:
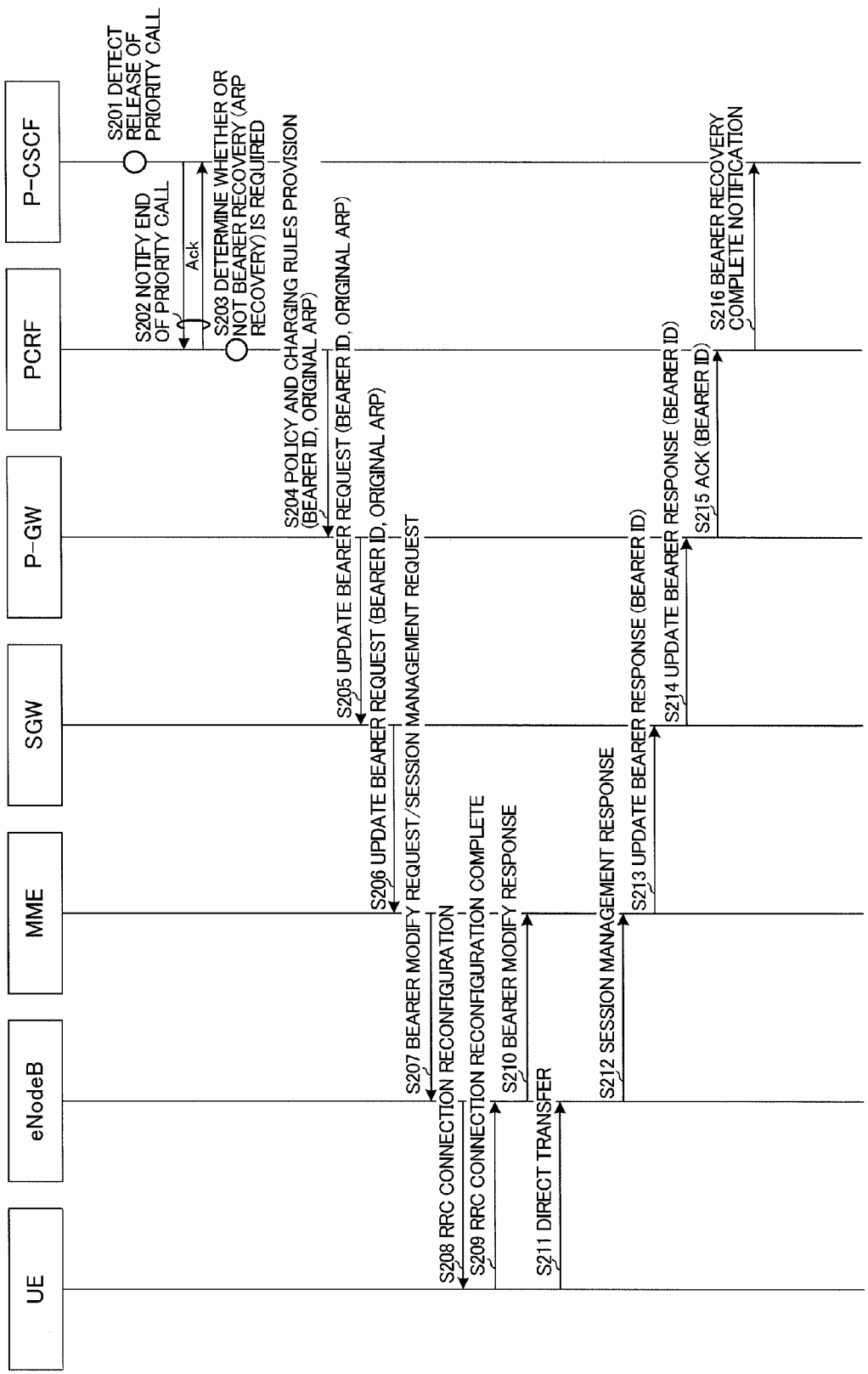
FIG. 12 is a sequence diagram illustrating operations at the release of a priority call, according to the first embodiment.

The operations of the mobile communication system according to the first embodiment at the release of a priority call will be described now with reference to FIGS. 12 to 13. FIG. 12 is a sequence diagram illustrating the operations of the mobile communication system according to the first embodiment at the release of a priority call.

Upon detecting a release of a priority call that has been started by the above-described INVITE signal (step S201), the call control node P-CSCF sends "priority call release notification," which notifies that the priority call has been released, to the priority control node PCRF, and the priority control node PCRF sends "Ack," which notifies reception of "priority call release notification," to the call control node P-CSCF (step S202).

Upon receiving "priority call release notification" from the call control node P-CSCF, the priority control node PCRF determines whether it is required to recover the ARP of the IMS call control signal bearer (step S203).

Figure 13:
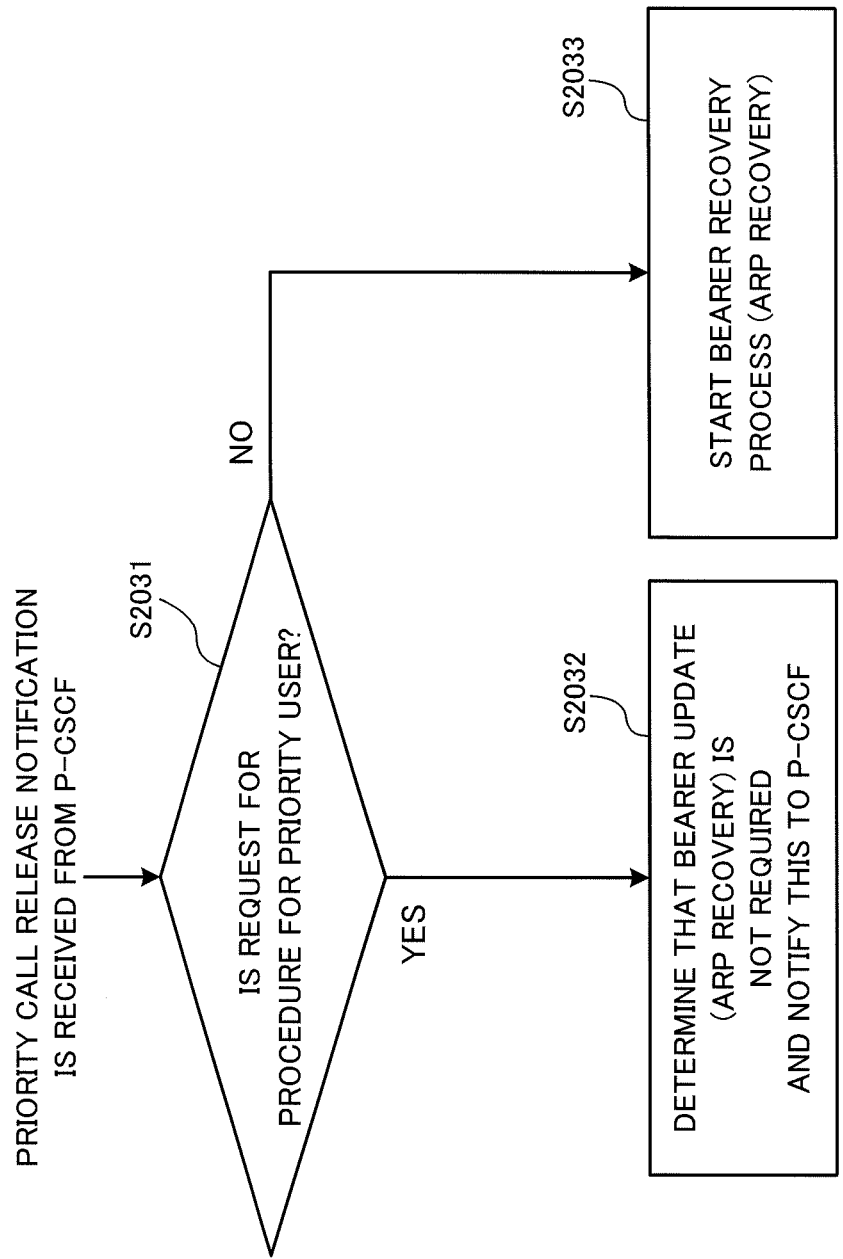
FIG. 13 is a flowchart illustrating operations at the release of a priority call, according to the first embodiment.

FIG. 13 is a flow of determining whether it is required to recover the ARP of the IMS call control signal bearer in the priority control node PCRF. As illustrated in FIG. 13, upon receiving "priority call release notification" from the call control node P-CSCF, the priority control node PCRF determines whether "priority call release notification" is a notification for a priority user, that is to say, whether or not the ARP that is currently set in the IMS call control signal bearer and the ARP that is originally set in the IMS call control signal bearer match (step S2031). Note that the priority control node PCRF may hold the ARP that is originally set in the IMS call control signal bearer, in the own node, or may acquire it from a subscriber management server HSS (not shown).

In the event "priority call release notification" is a notification for a priority user, that is to say, in the event the ARP that is currently set and the ARP that is originally set match (step S2031: Yes), the priority control node PCRF determines that it is not required to recover the ARP of the IMS call control signal bearer to the ARP that is originally set, and notifies this to call control node P-CSCF (step S2032).

On the other hand, in the event "priority call release notification" is not a notification for a priority user, that is to say, in the event the ARP that is currently set and the ARP that is originally set in advance do not match (step S2031: No), the priority control node PCRF determines that it is required to recover the ARP of the IMS call control signal bearer to the ARP that is originally set, and notifies this to the call control node P-CSCF (step S2033).

By means of the above decision flow, when the processing of recovering the ARP of the IMS call control signal bearer is determined to be required, the ARP recovery processing is performed in steps S204 to S215 illustrated in FIG. 12. To be more specific, the priority control node PCRF sends "Policy and Charging Rules Provision," which includes the bearer ID of the IMS call control signal bearer and the ARP that is originally set in the IMS call control signal bearer, to the gateway P-GW (step S204). Here, "Policy and Charging Rules Provision" functions as a priority recovery request signal to request change of the ARP of the IMS call control signal bearer to the ARP that is originally set, and includes the bearer ID to identify the IMS call control signal bearer and the ARP (for example, 11 (low priority)) that is originally set in the IMS call control signal bearer.

Upon receiving "Policy and Charging Rules Provision," the gateway P-GW sends "Update Bearer Request (bearer modify request signal)," which includes the bearer ID and ARP included in "Policy and Charging Rules Provision," to the gateway S-GW (step S205). The gateway S-GW transfers "Update Bearer Request" received from the gateway P-GW, to the mobility management node MME (step S206).

Since the mobile terminal UE is in a connected state at the release of a priority call, when the mobility management node MME receives "Update Bearer Request" from the gateway S-GW, the mobility management node MME sends "Bearer Modify Request/Session Management Request" to the radio base station eNode B (step S207).

The radio base station eNode B sends "RRC Connection Reconfiguration," which requests reconfiguration of an RRC connection, to the mobile terminal UE (step S208), and sends "RRC Connection Reconfiguration Complete," which reconfigures an RRC connection, to the radio base station eNode B (step S209), and the radio base station eNode B sends "Bearer Modify Response" to the mobility management node MME (step S210).

The mobile terminal UE sends "Direct Transfer" to the radio base station eNode B (step S211), and the radio base station eNode B sends "Session Management Response" to the mobility management node MME (step S212).

The mobility management node MME sends "Update Bearer Response" to the gateway S-GW (step S213), and the gateway S-GW transfers "Update. Bearer Response" to the gateway S-GW (step S214).

Upon receiving "Update Bearer Request" from the gateway S-GW, the gateway P-GW sends "Ack," which notifies that the ARP of the IMS call control signal bearer has been recovered to the ARP that is originally set, to the priority control node PCRF (step S215).

The priority control node PCRF sends "bearer recovery complete notification," which notifies that the ARP of the IMS call control signal bearer has been updated to the ARP that is originally set, to the call control node P-CSCF (step S216).

<Operation•Effect>

In the mobile communication system according to the first embodiment of the present invention, when an INVITE signal including priority call information is received by a call control node P-CSCF, the value of the ARP of an IMS call control signal bearer for sending the INVITE signal to a mobile terminal is changed so as to indicate a high priority.

Consequently, it is possible to perform, preferentially, procedure for establishing an IMS call control signal bearer for a priority call (that is to say, a paging procedure related to a priority call, an RRC connection establishment procedure between a mobile terminal UE and a radio base station eNode B, a radio access bearer establishment procedure between the mobile terminal UE and the gateway S-GW, a GTP tunnel or GRE tunnel establishment procedure between the gateway S-GW and the gateway P-GW, and so on) and transfer an INVITE signal for a priority call preferentially.

Also, it is possible to prevent resources from being allocated to an IMS call control signal bearer for a normal call preferentially and prevent an IMS call control signal bearer for a priority call from being disconnected.

Also, since it is possible to recover the ARP of an IMS call control signal bearer at the release of a priority call to the ARP that is originally set, it is possible to prevent resources from being preferentially allocated to that IMS call control signal bearer after the release of the priority call.

Second Embodiment

Next, regarding the mobile communication system according to a second embodiment, differences from the first embodiment will be mainly described. A case will be described with the second embodiment where, instead of GTP, PMIPv6 is used as the signal protocol between the gateway P-GW and the gateway S-GW.

<Operations of Mobile Communication System>

(2-1) Operations Upon Reception Of Priority Call

Figure 14:
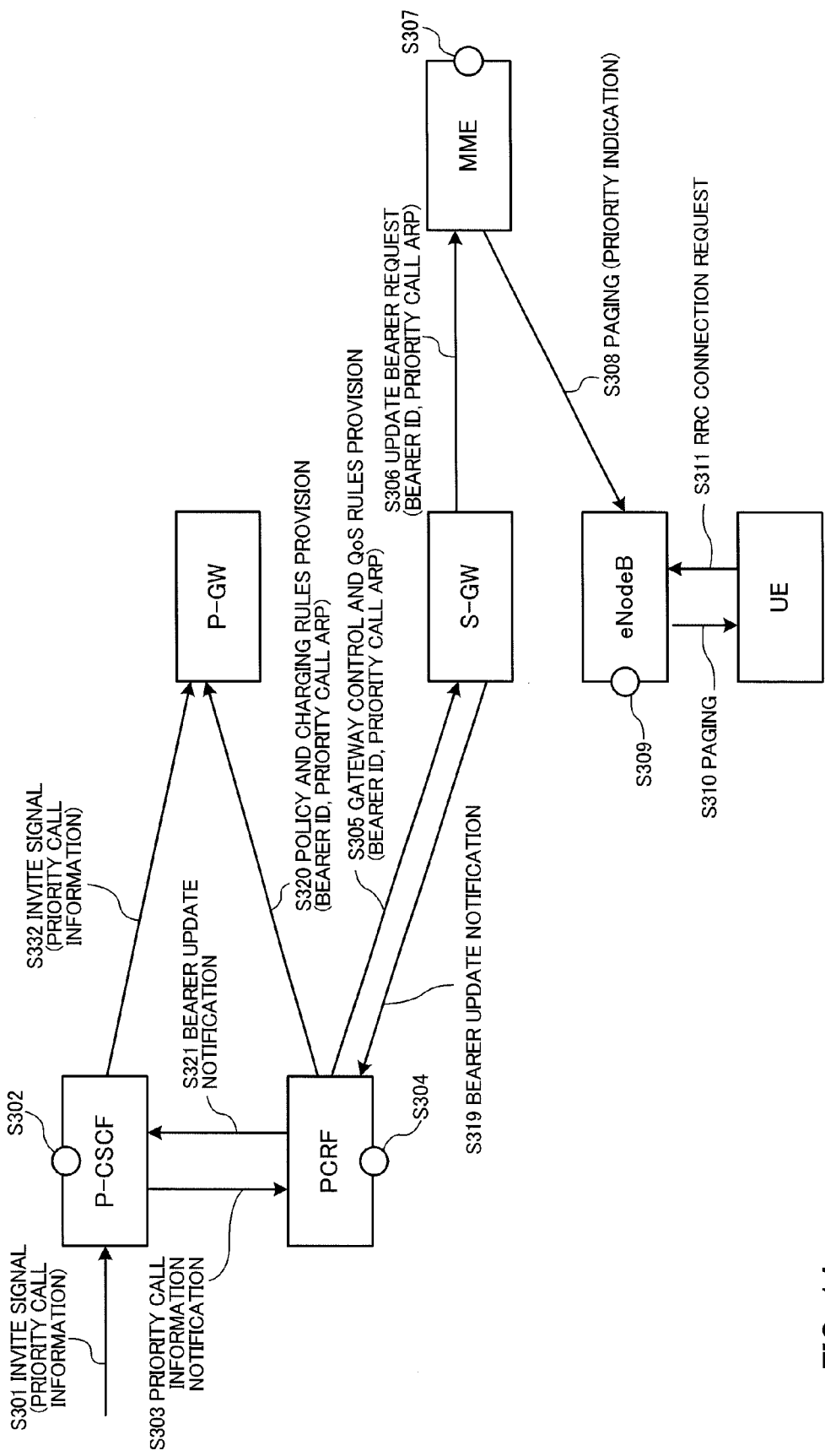
FIG. 14 is a schematic diagram illustrating operations upon reception of a priority call, according to a second embodiment.
Figure 15:
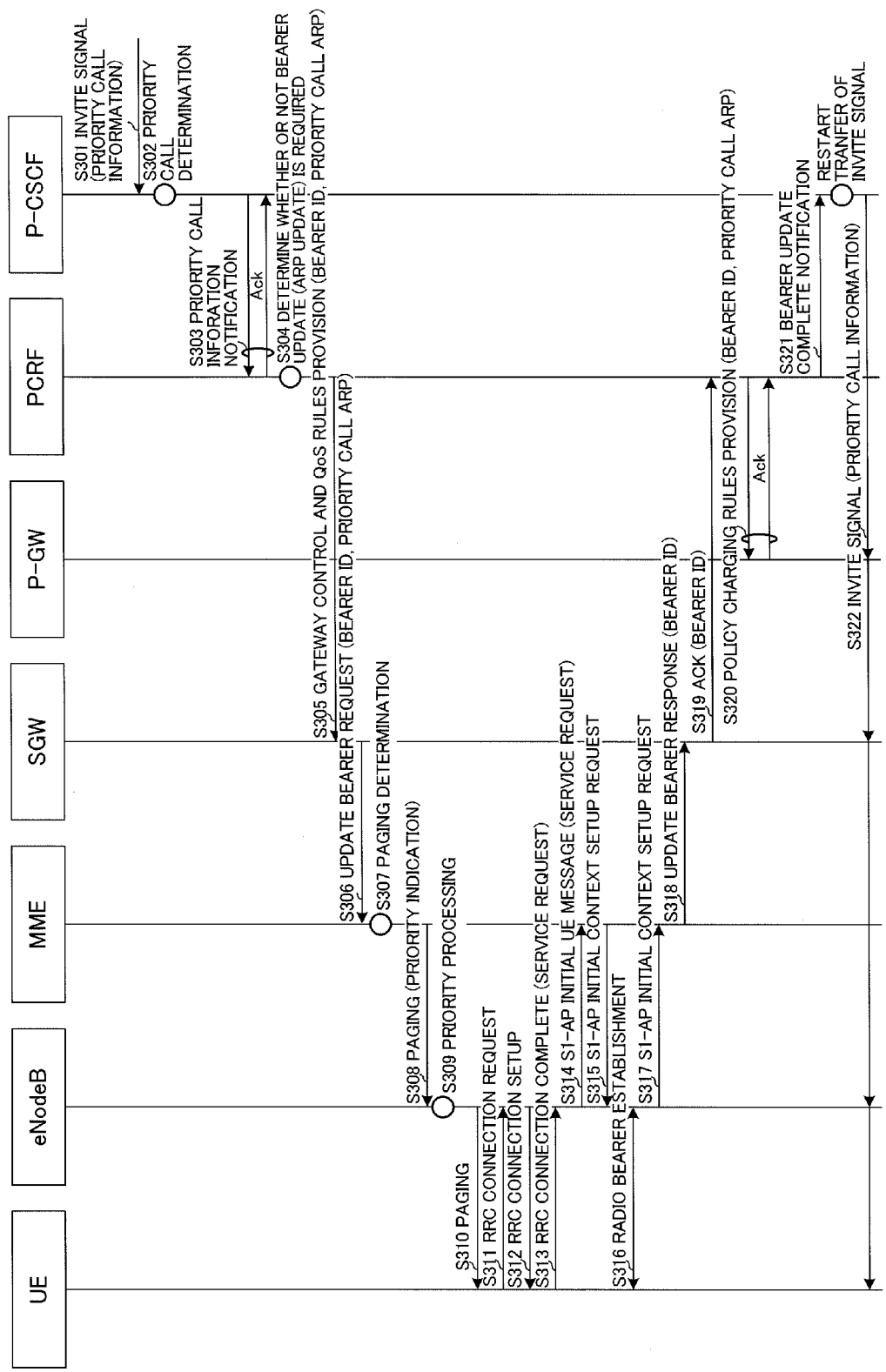
FIG. 15 is a sequence diagram illustrating operations upon reception of a priority call, according to a second embodiment.

Now, the operation of the mobile communication system according to the second embodiment upon reception of a priority call will be described with reference to FIGS. 14 to 15. FIGS. 14 and 15 are a schematic diagram and a sequence diagram illustrating the operations of the mobile communication system according to the second embodiment upon reception of a priority call. Note that the same codes in FIGS. 14 and 15 designate the same steps. Note that the operations of step S301 through S304 in FIGS. 14 and 15 are the same as the operations of step S101 through S104 in FIGS. 8 and 9.

In the event the processing of changing the ARP of the IMS call control signal bearer is determined to be required, the priority control node PCRF sends "Gateway Control and QoS Rules Provision" to the gateway S-GW (step S305). Here, "Gateway Control and QoS Rules Provision" functions as the first priority change request signal to request change of the ARP of the IMS call control signal bearer to a priority call ARP, and includes the bearer ID to identify the IMS call control signal bearer and the priority call ARP.

The gateway S-GW sends "Update Bearer Request (bearer update request signal)," which includes the bearer ID and priority call ARP included in "Gateway Control and QoS Rules Provision," to the mobility management node MME (step S306). The operations of step S307 through S318 in FIGS. 14 and 15 are the same as the operations of step S108 through S119 in FIGS. 8 and 9.

Upon receiving "Update Bearer Request" from the mobility management node MME, the gateway S-GW sends "Ack," which indicates that the ARP of the IMS call control signal bearer has been changed to a priority call ARP, to the priority control node PCRF (step S319).

In response to the reception of "Ack" in step S319, the priority control node PCRF sends "Policy and Charging Rules Provision" to the gateway P-GW. Here, "Policy and Charging Rules Provision" functions as a second priority change request signal to request change of the ARP of the IMS call control signal bearer to a priority call ARP, and includes the bearer ID to identify the IMS call control signal bearer and the priority call ARP. After having finished the ARP change processing, the gateway P-GW sends "Ack" to indicate that the ARP change processing has finished, to the priority control node PCRF (step S320).

The priority control node PCRF sends "bearer update complete notification," which notifies that change of the ARP of IMS call control signal bearer is complete, to the call control node P-CSCF (step S321). In response to this notification of completion of the IMS call control bearer update procedure, the call control node P-CSCF transfers an INVITE signal including priority call information, to the gateway P-GW. Using the changed IMS call control signal bearer, the gateway P-GW sends the INVITE signal which includes priority call information, to the mobile terminal UE, via the gateway S-GW and radio base station eNode B (step S322).

(2-2) Operations at Release of Priority Call

Figure 16:
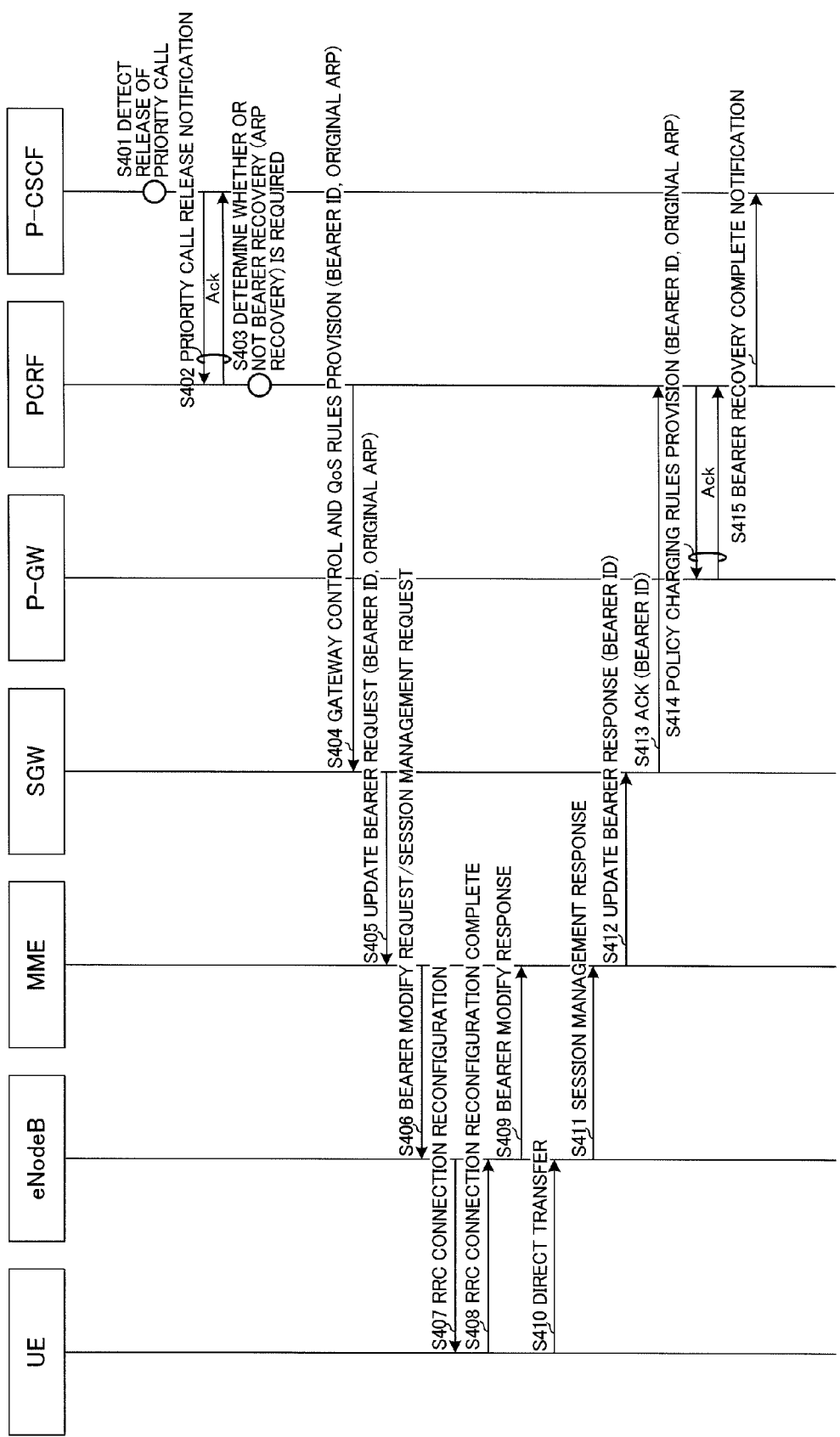
FIG. 16 is a sequence diagram illustrating operations at the end of a priority call, according to a second embodiment.

The operations of the mobile communication system according to the second embodiment at the release of a priority call will be described now with reference to FIG. 16. FIG. 16 is a sequence diagram illustrating operations at the release of a priority call, according to the second embodiment. Note that the operations of step S401 through S403 in FIG. 16 are the same as the operations of step S201 through S203 in FIG. 12.

In the event the process of recovering the ARP of the IMS call control signal bearer is determined to be required, the priority control node PCRF sends "Gateway Control and QoS Rules Provision" to the gateway S-GW (step S404). Here, "Gateway Control and QoS Rules Provision" functions as the first priority recovery request signal to request recovery of the ARP of the IMS call control signal bearer to the ARP that is originally set, and includes the bearer ID to identify the IMS call control signal bearer and the ARP that is originally set in that IMS call control signal bearer (for example, 11 (low priority)).

The gateway S-GW sends "Update Bearer Request (bearer update request signal)," which includes the bearer ID and ARP included in "Gateway Control and QoS Rules Provision," to the mobility management node MME (step S405). The operations of step S406 through S412 in FIGS. 14 and 15 are the same as the operations of step S207 through S213 in FIGS. 12 and 13.

The gateway S-GW sends "Ack," which notifies that the ARP of the IMS call control signal bearer has been recovered to the ARP that is originally set, to the priority control node PCRF (step S413).

In response to the reception of "Ack" in step S413, the priority control node PCRF sends "Policy and Charging Rules Provision" to the gateway P-GW. Here, "Gateway Control and QoS Rules Provision" functions as a second priority recovery request signal to request recovery of the ARP of the IMS call control signal bearer to the ARP that is originally set, and includes the bearer ID to identify the IMS call control signal bearer and the ARP that is originally set in that IMS call control signal bearer. After having performed the ARP recovery processing, the gateway P-GW sends "Ack" to indicate that the ARP recovery processing has performed, to the priority control node PCRF (step S414).

The priority control node PCRF sends "bearer recovery complete notification," which notifies that the ARP of the IMS call control signal bearer has been recovered to the ARP that is originally set, to the call control node P-CSCF (step S415).

<Operation•Effect>

In the mobile communication system according to the second embodiment of the present invention, even in the event PMIPv6 is used, it is possible to perform, preferentially, procedure for establishing an IMS call control signal bearer for a priority call (that is to say, a paging procedure related to a priority call, an RRC connection establishment procedure between a mobile terminal UE and a radio base station eNode B, a radio access bearer establishment procedure between the mobile terminal UE and the gateway S-GW, a GTP tunnel or GRE tunnel establishment procedure between the gateway S-GW and the gateway P-GW, and so on) and transfer an INVITE signal for a priority call preferentially.

Also, even in the event PMIPv6 is used, it is possible to recover the ARP of an IMS call control signal bearer at the release of a priority call to the ARP that is originally set, and it is therefore possible to prevent resources from being preferentially allocated to that IMS call control signal bearer after the release of the priority call.

Other Embodiments

Now, although the present invention has been described in detail with reference to the above embodiments, it should be obvious to a person skilled in the art that the present invention is by no means limited to the embodiments described in this specification. The present invention can be implemented with various corrections and in various modifications, without departing from the spirit and scope of the present invention defined by the recitations of the claims. Consequently, the descriptions in this specification are provided only for the purpose of explaining examples, and should by no means be construed to limit the present invention in any way.

The disclosure of Japanese Patent Application No. 2010-001452, filed on Jan. 6, 2010, including the specification, drawings, and abstract, is incorporated herein by reference in its entirety.

The invention claimed is:

1. A mobile communication method comprising the steps of:

at a call control node, upon a reception of a call connection request signal which is an INVITE signal corresponding to a priority call, notifying a reception of the call connection request signal including priority call information, to a priority control node;

at the priority control node, in response to a notification of the reception of the call connection request signal from the call control node, determining whether it is required to change a priority of a call control signal bearer for sending the call connection request signal from a first gateway connected to the call control node to a mobile terminal, to a higher priority than a priority set in the call control signal bearer;

changing the priority of the call control signal bearer to the higher priority than the priority set in the call control signal bearer, when it is required to change the priority of the call control signal bearer; and performing a paging for the mobile terminal according to the changed priority of the call control signal bearer, wherein the call control node is a Proxy-Call Session Control Function (P-CSCF) at a terminating end which receives the INVITE signal as the call connection request signal transferred from an originating end, wherein in the step of performing the paging, when the priority of the call control signal bearer is changed to the higher priority than the priority set in the call control signal bearer, a mobility management node sends a paging signal including a priority indication to a radio base station so that the radio base station performs a prioritized paging for the mobile terminal according to the changed priority, and wherein the call control signal bearer is a dedicated call control signal bearer, set up between the first gateway and the mobile terminal for sending the INVITE signal received by the Proxy-Call Session Control Function, from the first gateway to the mobile terminal.

2. The mobile communication method as claimed in claim 1, wherein:

the step of changing the priority of the call control signal bearer includes:
  at the priority control node, sending a priority change request signal including the higher priority than the priority set in the call control signal bearer, to the first gateway; and
  at the first gateway, sending a bearer update request signal including the priority that is included in the priority change request signal, to the mobility management node via a second gateway.

3. The mobile communication method as claimed in claim 1, wherein:

the step of changing the priority of the call control signal bearer includes:
  at the priority control node, sending a first priority change request signal including the higher priority than the priority set in the call control signal bearer, to a second gateway connected to the first gateway;
  at the second gateway, sending a bearer update request signal including the priority that is included in the first priority change request signal, to the mobility management node; and
  at the priority control node, when it is notified from the second gateway that the priority of the call control signal bearer has been changed, sending a second priority change request signal including the higher priority than the priority set in the call control signal bearer, to the first gateway.

4. The mobile communication method as claimed in claim 1, further comprising the steps of:
  at the call control node, notifying a release of the priority call that has been started by the call connection request signal to the priority control node;
  at the priority control node, in response to a notification of the release of the priority call from the call control node, determining whether it is required to recover the priority of the call control signal bearer to the priority set originally in the call control signal bearer; and
  recovering the priority of the call control signal bearer to the priority set originally in the call control signal bearer, when it is required to recover the priority of the call control signal bearer.

5. The mobile communication method as claimed in claim 4, wherein the step of recovering the priority of the call control signal bearer includes:
  at the priority control node, sending a priority recovery request signal including the priority set originally in the call control signal bearer, to the first gateway; and
  at the first gateway, sending a bearer update request signal including the priority included in the priority recovery request signal, to the mobility management node via a second gateway; and
  at the mobility management node, reconfiguring a connection between the mobile terminal and the radio base station, based on the priority included in the bearer update request signal.

6. The mobile communication method as claimed in claim 4, wherein the step of recovering the priority of the call control signal bearer includes:
  at the priority control node, sending a first priority recovery request signal including the priority set originally in the call control signal bearer, to a second gateway connected to the first gateway;
  at the second gateway, sending the bearer update request signal including the priority that is included in the first priority recovery request signal, to the mobility management node; and
  at the mobility management node, reconfiguring a connection between the mobile terminal and the radio base station, based on the priority included in the bearer update request signal; and
  at the priority control node, when it is notified from the second gateway that the priority of the call control signal bearer has been recovered, sending a second priority recover request signal including the priority set originally in the call control signal bearer, to the first gateway.

7. A priority control node configured,
  when it is notified from a call control node that a call connection request signal including priority call information, which is an INVITE signal corresponding to a priority call, has been received, to determine whether it is required to change a priority of a call control signal bearer for sending the call connection request signal from a first gateway connected to the call control node to a mobile terminal, to a higher priority than a priority set in the call control signal bearer, and
  when a release of the priority call that has been started by the call connection request signal is notified from the call control node, to determine whether it is required to recover the priority of the call control signal bearer to the priority set originally in the call control signal bearer, wherein
  the call control node is a Proxy-Call Session Control Function (P-CSCF) at a terminating end which receives the INVITE signal as the call connection request signal transferred from an originating end, wherein
  when the priority of the call control signal bearer is changed to the higher priority than the priority set in the call control signal bearer, a paging signal including a priority indication is sent from a mobility management node to a radio base station so that the radio base station performs a prioritized paging for the mobile terminal according to the changed priority, and wherein
  the call control signal bearer is a dedicated call control signal bearer, set up between the first gateway and the mobile terminal, for sending the INVITE signal received by the Proxy-Call Session Control Function, from the first gateway to the mobile terminal.

8. The priority control node as claimed in claim 7, wherein the priority control node is configured to send a priority change request signal including the higher priority than the priority set in the call control signal bearer, to the first gateway, when it is required to change the priority of the call control signal bearer.

9. The priority control node as claimed in claim 7, wherein the priority control node is configured to send a first priority change request signal including the higher priority than the priority set in the call control signal bearer, to a second gateway connected to the first gateway, when it is required to change the priority of the call control signal bearer; and send a second priority change request signal including the higher priority than the priority set in the call control signal bearer, to the first gateway, when it is notified from the second gateway that the priority of the call control signal bearer has been changed.

10. The priority control node as claimed in claim 7, wherein the priority control node is configured to send a priority recovery request signal including the priority set originally in the call control signal bearer, to the first gateway, when it is required to recover the priority of the call control signal bearer.

11. The priority control node as claimed in claim 7, wherein the priority control node is configured to:

send a first priority recovery request signal including the priority set originally in the call control signal bearer, to a second gateway connected to the first gateway, when it is required to recover the priority of the call control signal bearer; and send a second priority recovery request signal including the priority set originally in the call control signal bearer, to the first gateway, when it is notified from the second gateway that the priority of the call control signal bearer has been recovered.

12. A mobility management node configured, upon reception of a priority call at a call control node, when a priority of a call control signal bearer for sending a call connection request signal which is an INVITE signal corresponding to a priority call, from a first gateway connected to a call control node to a mobile terminal is changed to a higher priority than a priority set in the call control signal bearer, to send a paging signal including a priority indication to a radio base station belonging to the mobility management node, so that a prioritized paging for the mobile terminal is performed according to the changed priority, wherein the call control node is a Proxy-Call Session Control Function (P-CSCF) at a terminating end which receives the INVITE signal as the call connection request signal transferred from an originating end, the call control signal bearer is a dedicated call control signal bearer, set up between the first gateway and the mobile terminal for sending the INVITE signal received by the Proxy-Call Session Control Function, from the first gateway to the mobile terminal, at the call control node, upon a reception of the call connection request signal which is the INVITE signal corresponding to the priority call, notifies a reception of the call connection request signal including priority call information, to a priority control node, at the priority control node, in response to a notification of the reception of the call connection request signal from the call control node, it is determined whether it is required to change a priority of the call control signal bearer for sending the call connection request signal from the first gateway connected to the call control node to the mobile terminal, to a higher priority than a priority set in the call control signal bearer, when it is required to change the priority of the call signal bearer, the priority of the call control signal bearer is changed to the higher than the priority set in the call control signal bearer, and a paging for the mobile terminal is electronically performed according to the changed priority of the call control signal bearer.

13. The mobility management node as claimed in claim 12, wherein the mobility management node is configured to receive a bearer update request signal including the changed priority of the call control signal bearer, and send a paging signal including a priority indication to the radio base station belonging to the mobility management node, so that a paging for the mobile terminal is performed according to the changed priority included in the bearer update request signal.

* * * * *